United States Patent
Pradel et al.

[19]

[11] Patent Number: 6,032,961

[45] Date of Patent: Mar. 7, 2000

[54] PISTON-CYLINDER UNIT INSTALLED BETWEEN A VEHICLE BODY AND WHEEL GUIDE PART

[75] Inventors: Robert Pradel, Röthlein; Gerald Fenn, Poppenhausen, both of Germany

[73] Assignee: Mannesmann Sachs AG, Schweinfurt, Germany

[21] Appl. No.: 09/119,324

[22] Filed: Jul. 20, 1998

[30] Foreign Application Priority Data

Jul. 21, 1997 [DE] Germany .......................... 197 31 139

[51] Int. Cl.[7] ........................................................ B62B 5/02
[52] U.S. Cl. ........................................................ 280/5.514
[58] Field of Search ............................... 267/218, 64.16; 280/5.514

[56] References Cited

U.S. PATENT DOCUMENTS

| | | | |
|---|---|---|---|
| 3,625,540 | 12/1971 | Jewell | 267/64.16 |
| 5,211,420 | 5/1993 | Iwashita | 280/5.503 |

FOREIGN PATENT DOCUMENTS

| | | | |
|---|---|---|---|
| 0 501 115 A1 | 9/1992 | European Pat. Off. | B60G 17/02 |
| 32 23 195 A1 | 12/1983 | Germany | B60G 17/02 |
| 44 20 134 C1 | 10/1995 | Germany | F16F 9/49 |
| 2068080 | 8/1981 | United Kingdom | 267/64.16 |

*Primary Examiner*—Christopher P. Schwartz
*Assistant Examiner*—C. T. Bartz
*Attorney, Agent, or Firm*—Cohen, Pontani, Lieberman & Pavane

[57] ABSTRACT

A piston-cylinder unit for a hydropneumatic suspension system of a vehicle having a fluid-filled cylinder in which a piston having damping valves and connected to a piston rod is axially movable. The piston rod runs axially in a piston rod guide at the piston-rod exit of the cylinder and is sealed toward the outside by means of a piston rod seal. A spring surrounding the piston rod is in mounted between a first support part attached to the cylinder and a second support part attached to either the piston rod or a vehicle-fixed part. The spring, which interacts with an axially adjustable support part, can be lifted off one of the support parts. During compression of the piston-cylinder unit, the first and second support parts begin compression of the spring at the functional point of the compression. The functional point is adjustable in a predetermined position range by an adjustment device.

8 Claims, 5 Drawing Sheets

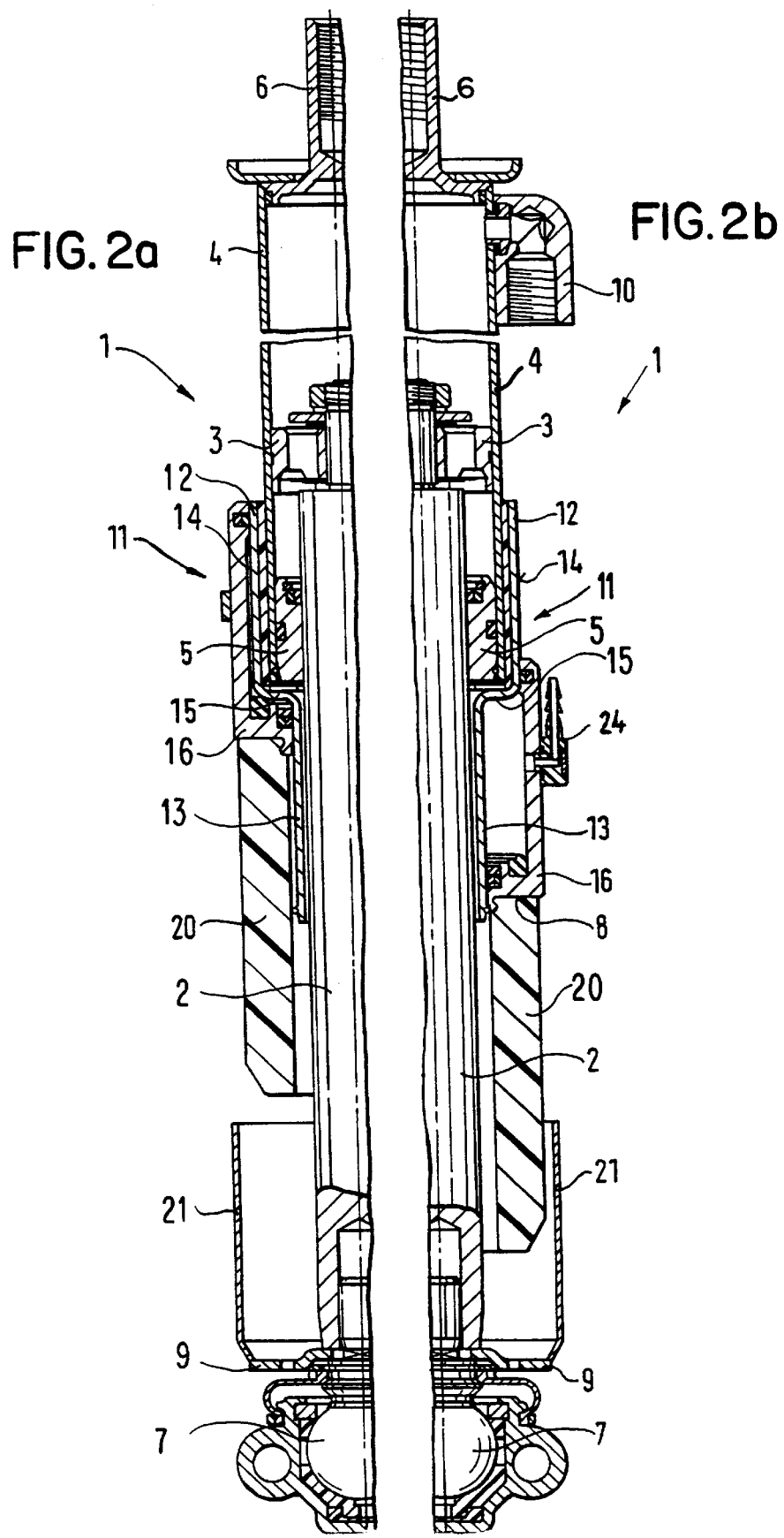

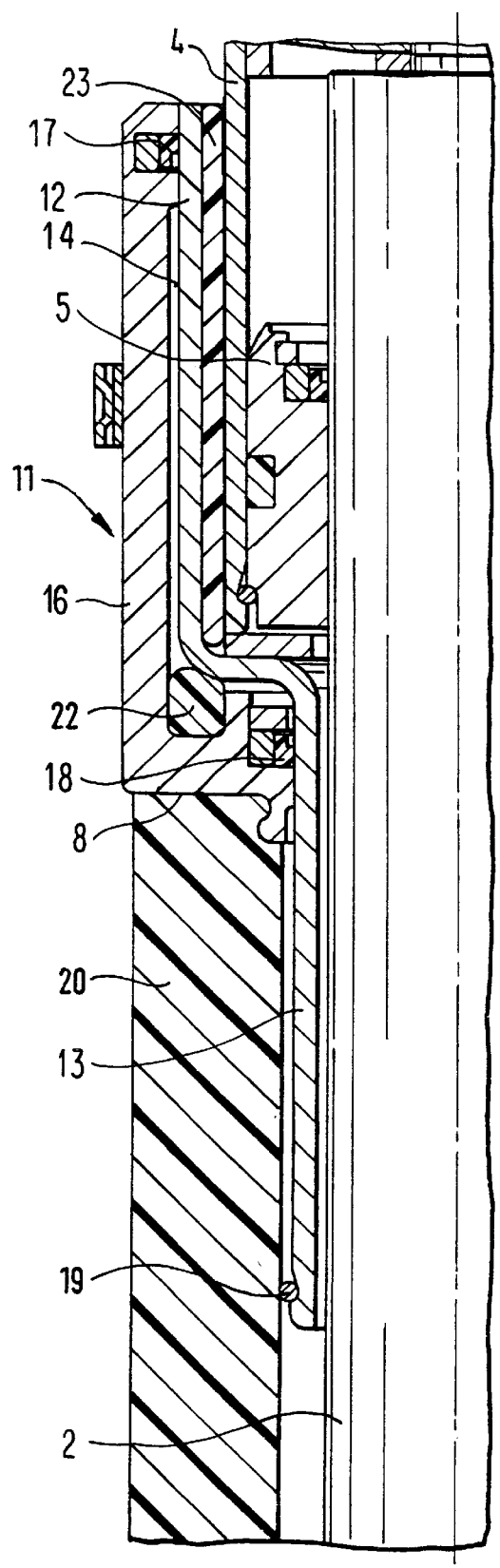
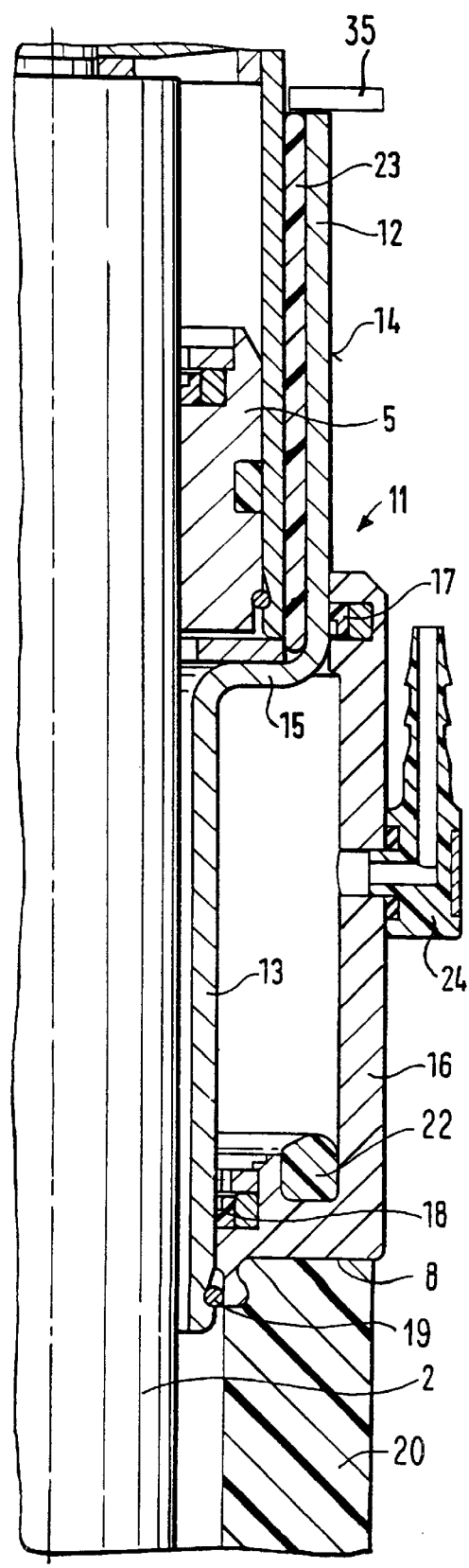

PISTON-CYLINDER UNIT INSTALLED BETWEEN A VEHICLE BODY AND WHEEL GUIDE PART

BACKGROUND OF THE INVENTION

1. Field of the Invention

The present invention relates to a piston-cylinder unit installed between a vehicle body and a wheel guide part.

2. Description of the Related Art

A prior art piston-cylinder unit, which is preferably embodied as a vibration damper, is known from EP 0 501 115 A1. The prior art unit is part of a controllable suspension system for wheel suspensions of motor vehicles. The suspension system comprises a first spring and a hydraulic vibration damper that operates parallel to the first spring as well as a second spring that also operates parallel to the first spring. In one embodiment, the first spring surrounds the vibration damper over the entire installation length, while the second spring is connected to a hydraulic piston of a switchable hydraulic system. The switching valve automatically closes upon power cutoff, so that the second hard spring is activated, resulting in a hard suspension and thus in reliable driving performance. It is also known to change the spring pre-bias in vehicle suspensions and to arrange a non-adjustable stop buffer, which is connected to the cylinder and surrounds the piston rod, in vibration dampers.

Also known are hydropneumatic suspension and damping systems with hydropneumatic accumulators separated from the spring cylinder. These systems are usually designed with an inherent frequency of approximately 1 Hz in the different permissible load states. In addition, the accumulator volume and its gas pre-stress are such that the diaphragm separating the gas space from the fluid space is prevented from coming to rest on either the gas-side or the fluid-side inner wall in any operating state.

SUMMARY OF THE INVENTION

The object of the present invention is to equip an existing hydropneumatic system, comprising a piston-cylinder unit and an accumulator, with a device for changing the level of the car body, without any change or any substantial change in the accumulator volume or gas pre-stress, ensuring a simple and economical total structure.

This object is attained by the present invention with a spring cylinder having a piston rod and a cylinder that are axially movable with respect to each other and a spring that interacts with an axially adjustable support part. The spring is liftable from one of its support parts during movement of the spring cylinder. The functional point of the spring with respect its two support parts is adjustable in a predeterminable position range of the piston rod in the cylinder by an adjustment device. It is thus possible, in predetermined position ranges of the piston rod, to use the action of the spring, which serves as an auxiliary spring to the piston-cylinder unit, so that adjustable spring stops are realized. Furthermore, it is also possible to provide a stop buffer of plastic or metal, rather than the spring. To raise the vehicle body, as is often desirable for travelling on ramps or in parking garages, the spring is simply moved into the "out" position by means of the adjustment device. This causes the spring to rest on the second support part at a substantially lesser in-travel or out-travel distance of the piston rod, so that the level of the vehicle body can be elevated or lowered, respectively. The properly positioned spring ensures that the system pressure never exceeds or falls below the values required for correct functioning of the diaphragm and seals of the accumulator. The standard accumulator design for these level adjustments can therefore be retained, resulting in a simple and economical total structure.

For an auxiliary spring to be used when the piston rod moves into the cylinder, it is very advantageous, according to a feature of the invention, for the adjustment device equipped with a support part to be arranged outside on the cylinder, while the other support part is connected to the piston rod in the area of the connection joint at the end of the piston rod.

Such adjustment devices are universally applicable, since they can be used without technical difficulties even in piston-cylinder units embodied as vibration dampers. This is possible because either the outer cylindrical tube carries the adjustment device and the spring forms an adjustable pressure stop or the adjustment device is arranged so as to form a tension stop in the interior of the cylinder. In this embodiment, the pressure supply of the adjustment device can be combined, for example, with that of the pressure medium circuit already required for the power steering.

In an especially advantageous design according to the invention, the piston-cylinder unit is embodied as a spring cylinder with a separately arranged hydropneumatic accumulator. In this case, the adjustment device located on the cylinder and forming the support part for the spring is hydraulically activatable and forms an axially adjustable pressure stop or an axially adjustable auxiliary spring.

The effectiveness of the seals in the spring cylinder is maintained so that the system pressure does not fall below a predetermined pressure in any movement phase and contact between the diaphragm and the fluid-side inner wall of the accumulator is avoided when the vehicle level is lowered. This is achieved, as indicated by a feature of the invention, because the hydraulically activatable adjustment device that carries the support part is arranged inside the cylinder, while a spring surrounding the piston rod and also arranged in the cylinder interacts with a support part attached to the piston rod in the area of the piston and forms an axially adjustable tension stop or an axially adjustable auxiliary spring. According to this feature, the spring cylinder is thus simply equipped with an adjustment device arranged outside the cylinder and with an adjustment device arranged inside the cylinder, and can therefore have both an adjustable pressure stop and an adjustable tension stop. The rigidity of the auxiliary spring can be selected within a wide range in accordance with the given requirements, so that the spring constitutes a more or less elastic stop.

As indicated by further features of the invention, the embodiment of the adjustment device for the pressure stop is a simple one. The adjustment part has an inner part reduced in diameter and arranged on the cylinder, and this inner part has running surfaces for a preferably hydraulically axially movable outer part, which is sealed relative to the running surfaces by seals. The outer part carries the hydraulic port and forms the support part, while the other support part is arranged at the end of the piston rod in the area of the connection joint. Such an adjustment device can be arranged on the cylinder in a simple and space-saving manner, because the running surface with the smaller diameter surrounds the piston rod, while the transition area from the smaller diameter to the larger diameter forms the axial support surface of the inner part on the front of the cylinder. As a result, it is easily possible to axially fix the adjustment device on the cylinder, whereby the inner part with the larger diameter is pressed onto the cylinder.

In further advantageous embodiment of the invention, an elastic stop that acts with the transition area in the axial direction is arranged in the outer part, while, to limit the out-travel movement of the outer part, a stop ring in a ring groove is attached to the end of the running surface with the smaller diameter. In this way, the outer part is prevented from metallically striking against the inner part in the axial direction; at the same time, a clear limit is established for the maximum excursion length of the adjustment device.

In the case of the auxiliary spring to be used after the piston rod moves into the spring cylinder to a certain depth, the spring force which auxiliary spring acts in series to that of the spring cylinder, the creation of noise is avoided, particularly in the lifted state, by embodying the auxiliary spring as an elastomer spring and connecting the support part that is attached the piston rod to a receptacle pot open toward the elastomer spring.

To ensure correct attachment of the inner part to the cylinder, with no change in the diameter of the larger-diameter running surface of the inner part, an intermediate tube of deformable plastic is arranged for the purpose of tolerance compensation between the outer wall of the cylinder and the inner wall of the inner part with the larger diameter.

For axial adjustment of the tension stop, a particularly simple and economical embodiment is achieved by the fact that the piston rod guide forms the outer part of the adjustment device secured in the cylinder, while the inner part carries the support part for the spring and is embodied as a step piston. The step piston, at one end, is run axially movably in a sealing fashion in the outer part. At its other end, the step piston is run axially movably in a sealing fashion on the inner wall of the cylinder. An annular space connected to the hydraulic port associated with the adjustment device is thereby provided between the two seals.

To block the compression of the wheels in the standing state in the case of mobile homes or ambulances, for example, or to block the compression of the wheels in the standing state and at low speeds in the case of certain utility vehicles, such as tractors with front-load shovels or lift stackers, the spring cylinder and/or the adjustable stop is embodied so as to be hydraulically blockable when the vehicle is standing still or travelling at very low speeds.

When the adjustment device is equipped according to the invention with a distance sensor, which detects the movement of the adjustment device relative to the cylinder, intermediate positions between "in" and "out" can be set. Further, the adjustment device, via a regulating unit controlled by a distance signal, can influence driving performance, for example, by stabilizing inclination.

Thanks to the advantageous effects, discussed above, of having a functional point that can changed by the adjustment device of a spring acting as an auxiliary to the spring cylinder, no changes in the accumulator volume and gas pre-stress associated with the normal level are needed for the level change according to the invention. The hydropneumatic accumulator can thus be optimized, with respect to the desired inherent frequency of the suspension system, without a requisite elevation or lowering of the vehicle body having to be taken into account.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIGS. 2a and 2b are partial longitudinal sectional views of an embodiment of a spring cylinder of the damping system of FIG. 1, with an axially adjustable pressure stop;

FIGS. 3a and 3b are detailed views of the area of adjustment device associated with the pressure stop with an auxiliary spring of the spring cylinder of FIGS. 2a and 2b respectively;

DETAILED DESCRIPTION OF THE PRESENTLY PREFERRED EMBODIMENTS

Figure 1:
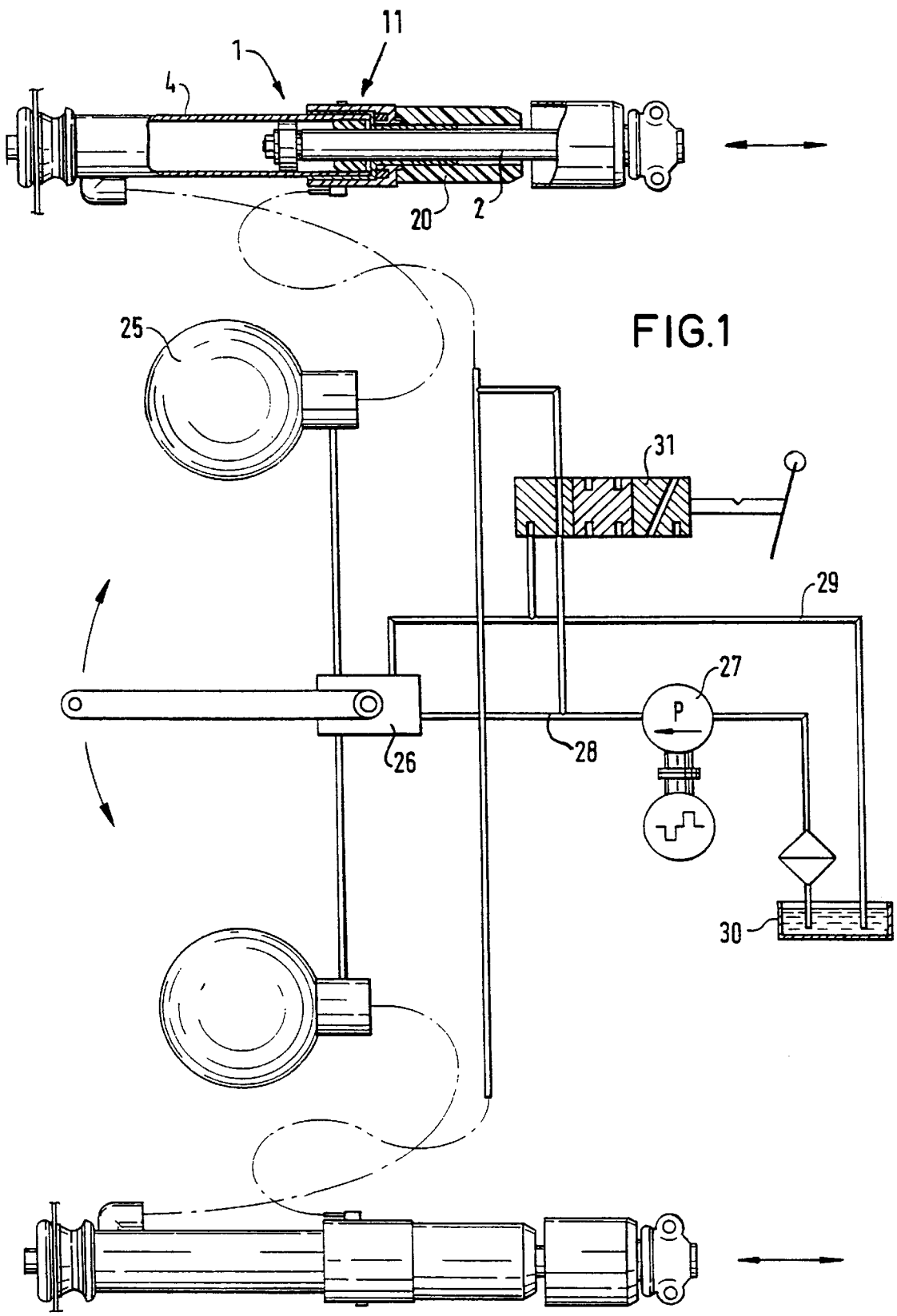
FIG. 1 is a schematic diagram of a hydropneumatic suspension unit and damping system according to an embodiment of the invention.

FIG. 1 is a schematic depiction of a hydropneumatic suspension system of a vehicle axle showing a spring cylinder 1 which is associated with each vehicle wheel. One side of the spring cylinder 1 is mounted in articulated fashion on the vehicle body while the other side is mounted in articulated fashion on a wheel guide part. A cylinder 4 of the spring cylinder 1 carries an adjustment device 11 with a spring 20. A piston rod 2 having a piston is inserted in the cylinder 4. After the piston rod 2 has moved into the cylinder 4 by a predetermined distance, the spring 20 is activated. Associated with each spring cylinder 1 is a hydropneumatic accumulator 25. The hydropneumatic accumulator 25 is hydraulically connectable to a supply container 30 via a level control valve 26, a pressure line 28 and a pump 27. The hydropneumatic accumulator 25 is also connectable to the supply container 30 through a feedback line 29. A pressure regulator may also be provided in the pressure line 28. Each adjustment device 11 is connected, via at least one line and an adjustment valve 31, to the pressure line 28 and the feedback line 29 leading to the supply container 30.

Each hydropneumatic accumulator 25 is a known device having a gas chamber separated by a diaphragm from a liquid chamber and is designed, with respect to size and gas pre-stress, such that the inherent suspension frequency of approximately 1 Hz is attainable during in normal driving operation and within the permitted vehicle load range. To avoid impermissibly high pressure shocks in the system, the diaphragm must be prevented from contacting either the gas-side wall or the fluid-side wall of the accumulator 25. In known hydropneumatic suspension systems, it is difficult to combine the various goals of required inherent suspension frequency, maximum permissible load, smallest possible structural size, and economical light-weight accumulator construction when driving operation with an elevated or lowered vehicle level is required. The remedy for this problem is to ensure incomplete compression upon level elevation and incomplete decompression upon level lowering. This is attained by an adjustable pressure stop and/or an adjustable tension stop. For level elevation, the spring 20 is axially moved out by the adjustment device 11 such that as the piston rod 2 moves into the cylinder 4 by a certain distance and strikes a support part, the spring 20 acts as the stop spring. Since the spring 20 is moved axially outward, it starts to counteract full compression with less compression of the spring cylinder 1 than if the spring 20 were moved axially inward. The system pressure can thus be kept lower, and a standard hydropneumatic accumulator 25 is large enough, even during level elevation. Level lowering is achieved by another adjustment device (not shown in FIG. 1) for a tension stop spring. When this spring is moved out, the decompression movement of the piston rod 2 is reduced, and thus the vehicle body is lowered.

FIGS. 2a through 3b show an embodiment of the adjustment device 11 for the spring 20 used for level elevation. The spring 20 is shown as an elastomer spring in this embodiment. An upper end of the spring cylinder 1 is attached to the vehicle body by a pin joint 6. A piston 3 having damping valves slides within the cylinder 4. The piston 3 is seated on a piston rod 2, which runs in a piston rod guide 5 and is sealed toward the outside. A ball-and-socket joint 7 at the outer end of the piston rod 2 is connectable to a wheel guide part of the vehicle (not shown). FIGS. 2a and 3a show the adjustment device 11 arranged on the cylinder 4 of the spring cylinder 1 in the moved-in position. In the moved-in position the spring 20 acts as a pure stop spring in the normal setting of the suspension and damping system. An inner part 12 has a large diameter portion and a small diameter portion. The large diameter portion of the inner part 12 forms a first running surface 14, and is attached to the cylinder 4 by an intermediate tube 23 made of deformable plastic. The smaller diameter portion of the inner part 12 surrounds the piston rod 2 and forms a second running surface 13. The transition area 15 between the smaller and the larger diameter portions of the inner part 12 forms the axial support surface on the front of the cylinder 4. An outer part 16 of the adjustment device 11 is slidably mounted on the inner part 12 and has two ring grooves for carrying a seal 17 for the running surface 14 and a seal 18 for the running surface 13. To limit the lift movement of the outer part 16, a stop ring 19 is attached to the inner part 12. To avoid metallic striking between the transition area of the inner part 12 and the outer part 16, an elastic stop 22 is mounted in the outer part 16 which interacts with the transition area 15.

Upon pressurization via a hydraulic port 24 located in the outer part 16, the outer part 16 is moved into the "out" position, as shown in FIGS. 2b and 3b. The spring 20, which is connected to the outer part 16 and rests on a support part 8 of the outer part 16. In the out position, the spring 20 is moved toward and into a receptacle pot 21 which is located at the end of the piston rod 2 adjacent the ball-and-socket joint 7. The bottom end of the receptacle pot 21 comprises a support part 9. When the spring 20 comes into contact with the support part 9 during compression of the spring cylinder 1, the spring acts as an auxiliary spring. When the outer part 16 is in the out position, the spring 20 contacts the support part 9 at a lesser compression of the spring cylinder 1 than when the outer part 16 is in the moved in position. The adjustment of the position of the outer part 16 permits level elevation of the vehicle without an impermissible pressure increase in the accumulator or without a pressure increase in the spring cylinder through a hydraulic port 10, because the moved-out spring 20 counteracts stronger compression.

Figure 4:
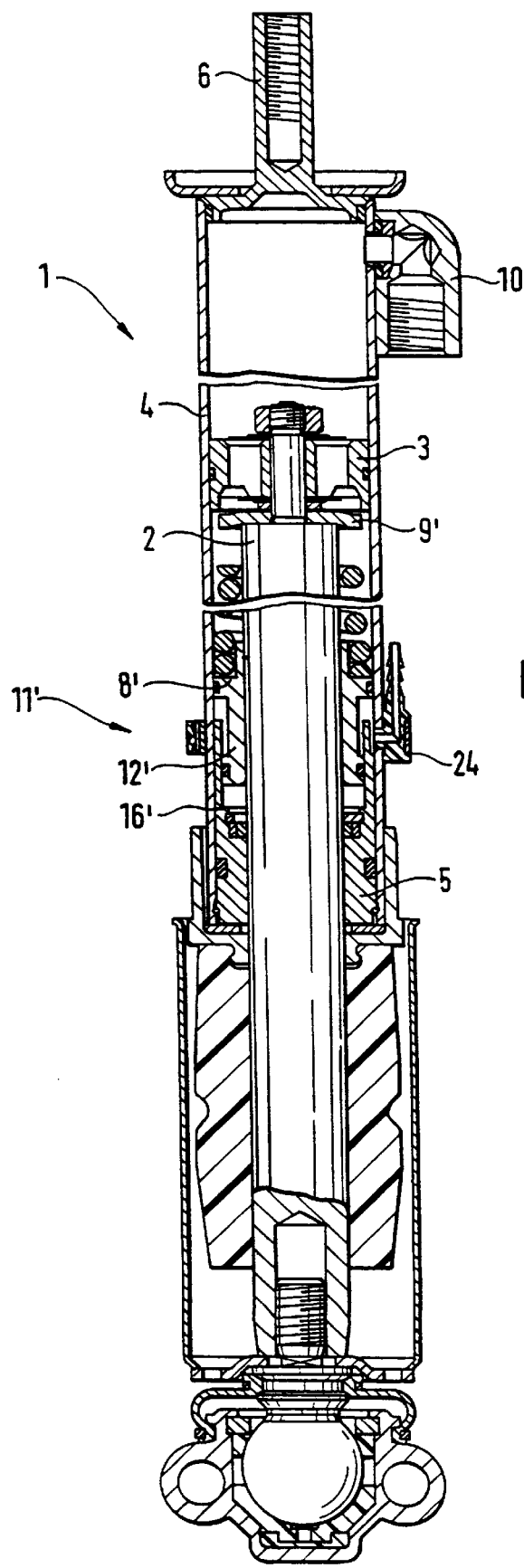
FIG. 4 is a longitudinal sectional view of another embodiment of the spring cylinder of the damping device of FIG. 1, with an axially adjustable tension stop.
Figure 5:
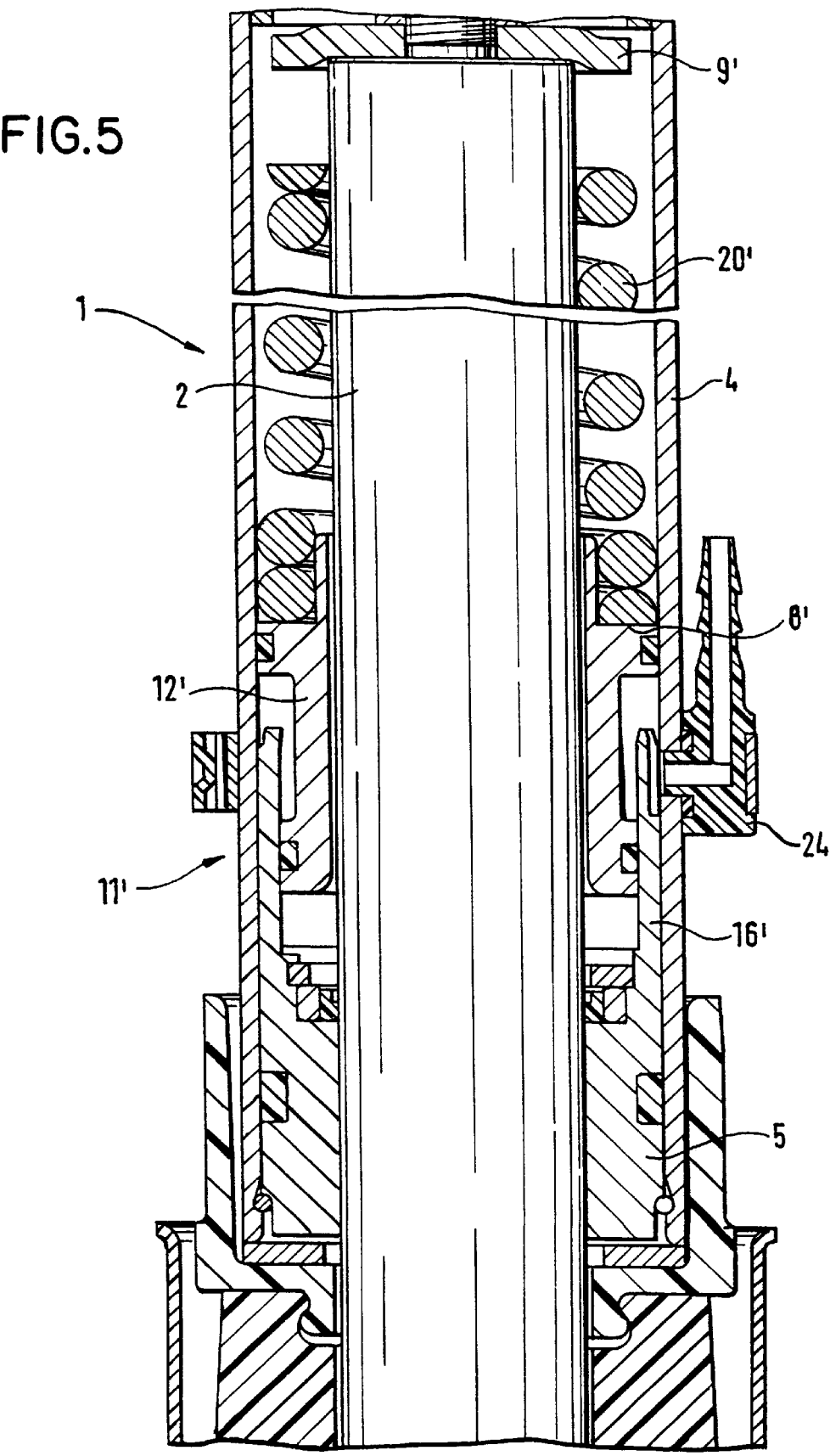
FIG. 5 is a detailed view of the adjustment device associated with tension stop of FIG. 4.

FIGS. 4 and 5 show an embodiment of the present invention comprising an adjustable tension stop. An adjustment device 11' is arranged inside the cylinder 4 of the spring cylinder 1, between the piston 3 equipped with damping valves and the piston rod guide 5. A first support part 9' for a spring 20' is attached to the piston rod 2 adjacent the piston 3. A second support part 8' is formed by an inner part 12' of the adjustment part 11'. This inner part 12' comprises a step piston having a small diameter portion and a large diameter portion. The larger diameter portion contacts the inner wall of the cylinder 4 in a sealing manner and the smaller diameter portion contacts an inner surface of a cylindrical outer part 16' in a sealing manner. The cylindrical outer part 16' is formed by the piston rod guide 5. An annular space formed between the two seals is connected to the hydraulic port 24 in the cylinder 4. Increasing the pressure in the annular space causes the inner part 12' to move outward from the outer part 16' so that the spring 20' which is embodied as a helical spring is moved toward the first support part 9'. In the "in" position of the adjustment device 11', the spring 20' forms the tension stop. In the "out" position of the adjustment device 11', the spring 20' acts as an auxiliary spring when the spring 20' rests on the first support part 9'. The spring 20' establishes an excursion limit for the piston rod 2, so that, when the vehicle body is in a lowered position, as is desirable especially at higher speeds, the spring force of the spring 20' counteracts the elevation of the vehicle body over a predetermined distance. Therefore, in the lowered vehicle position, the pressure in the suspension and damping system cannot drop below a critical value, because the spring 20' prevents an impermissible excursion movement of the piston rod 2 below a critical value, i.e., below the required press-on pressure of the seal. The prevention of the movement of the piston rod 2 below a critical value prevents the diaphragm of the hydropneumatic accumulator 25 from coming to rest on the fluid-side wall of the hydropneumatic accumulator 25.

With the described adjustment devices, it is only possible to implement "in" and "out" positions for the functional point of the spring. However, an optional distance sensor 35 may be arranged between the cylinder and the adjustment device for establishing intermediate positions between "in" and "out". Furthermore, use of a combination of the distance sensor 35 and a regulating device permits influence driving performance such, for example, as by stabilizing inclination. It is also possible for the spring to have high rigidity and form a virtually non-elastic stop. This is advantageous when the spring movement is to be blocked with the adjustment device, as is often desired in the case of stationary mobile homes or ambulances. It may also possible to deactivate the spring movement of the vehicle body by hydraulically blocking the suspension and damping system. It is also contemplated that the embodiment in FIGS. 2a–3b may be combined with the embodiment in FIGS. 4 and 5, thereby producing a piston-cylinder unit with both an adjustable pressure stop and an adjustable tension stop or auxiliary springs effective in both directions of movement.

The invention is not limited by the embodiments described above which are presented as examples only but can be modified in various ways within the scope of protection defined by the appended patent claims.

We claim:

1. A piston-cylinder unit for installation between a vehicle body and a wheel guide part of a vehicle, comprising:
   a fluid-filled cylinder having a closed end and an open end;
   a piston rod guide mounted on said open end of said cylinder;
   a piston rod axially movably mounted through said piston rod guide having an internal end in said cylinder and an external end outside of said cylinder;
   a piston mounted on said internal end of said piston rod for axial movement within said cylinder;
   a first support part connected to said cylinder and a second support part connected to one of said piston rod and the vehicle body, a position of said second support part being axially adjustable relative to said first support part;

a spring surrounding said piston rod and mounted between said first and second support parts, said spring being liftable from one of said support parts by a predetermined distance such that said spring is activated at a functional point during compression of said piston-cylinder unit; and an adjustment device for adjusting a position of said functional point of said spring, wherein said adjustment device comprises an inner part having a larger diameter portion and a smaller diameter portion, said inner part comprising first and second running surfaces corresponding to larger diameter portion and said smaller diameter portion, said adjustment device further comprising a hydraulically axially adjustable outer part sealed by first and second seals relative to said first and second running surfaces, respectively, and wherein said outer part comprises a hydraulic port and forms said first support part.

2. The piston-cylinder unit of claim 1, wherein said inner part comprises a transition part between said smaller diameter portion and said larger diameter portion wherein said second running surface surrounds said piston rod and said transition area of said inner part forms an axial support surface on said open end of said cylinder.

3. The piston-cylinder unit of claim 2, further comprising an elastic stop in said outer part acting in an axial direction with said transition area; and a stop ring at an end of said second running surface for limiting a lifting movement of said outer part.

4. The piston-cylinder unit of claim 1, wherein said spring comprises an elastomer spring, and said second support part comprises a receptacle pot open toward said spring.

5. The piston-cylinder unit of claim 1, further comprising an intermediate tube made of deformable plastic arranged between an outer wall of said cylinder and an inner wall of said larger diameter portion of said inner part.

6. A piston-cylinder unit for installation between a vehicle body and a wheel guide part of a vehicle, comprising:

a fluid-filled cylinder having a closed end and an open end;

a piston rod guide mounted on said open end of said cylinder;

a piston rod axially movably mounted through said piston rod guide having an internal end in said cylinder and an external end outside of said cylinder;

a piston mounted on said internal end of said piston rod for axial movement within said cylinder;

a first support part connected to said cylinder and a second support part connected to one of said piston rod and the vehicle body, a position of said second support part being axially adjustable relative to said first support part;

a spring surrounding said piston rod and mounted between said first and second support parts, said spring being liftable from one of said support parts by a predetermined distance such that said spring is activated at a functional point during compression of said piston-cylinder unit; and an adjustment device for adjusting a position of said functional point of said spring, wherein said adjustment device comprises an outer part and an inner part, said piston rod guide comprising said outer part and is secured in said cylinder;

said inner part comprises said first support part for said spring and comprises a step piston having first and second ends, a first seal at said first end is in sealing contact with said outer part and a second seal at said second end is in sealing contact with an inner wall of said cylinder, said first and second seals bounding an annular space that is in hydraulic communication with a hydraulic port of the adjustment device.

7. A piston-cylinder unit for installation between a vehicle body and a wheel guide part of a vehicle, comprising:

a fluid-filled cylinder having a closed end and an open end;

a piston rod guide mounted on said open end of said cylinder;

a piston rod axially movably mounted through said piston rod guide having an internal end in said cylinder and an external end outside of said cylinder;

a piston mounted on said internal end of said piston rod for axial movement within said cylinder;

a first support part connected to said cylinder and a second support part connected to one of said piston rod and the vehicle body, a position of said second support part being axially adjustable relative to said first support part;

a spring surrounding said piston rod and mounted between said first and second support parts, said spring being liftable from one of said support parts by a predetermined distance such that said spring is activated at a functional point during compression of said piston-cylinder unit; and an adjustment device for adjusting a position of said functional point of said spring, wherein said piston-cylinder unit is hydraulically blockable when the vehicle is standing still or travelling at very low speed.

8. A piston-cylinder unit for installation between a vehicle body and a wheel guide part of a vehicle, comprising:

a fluid-filled cylinder having a closed end and an open end;

a piston rod guide mounted on said open end of said cylinder;

a piston rod axially movably mounted through said piston rod guide having an internal end in said cylinder and an external end outside of said cylinder;

a piston mounted on said internal end of said piston rod for axial movement within said cylinder;

a first support part connected to said cylinder and a second support part connected to one of said piston rod and the vehicle body a position of said second support part being axially adjustable relative to said first support part;

a spring surrounding said piston rod and mounted between said first and second support parts, said spring being liftable from one of said support parts by a predetermined distance such that said spring is activated at a functional point during compression of said piston-cylinder unit;

an adjustment device for adjusting a position of said functional point of said spring; and a distance sensor for detecting movement between said cylinder and said adjustment device, thereby permitting an adjustment of said adjusting device to intermediate positions between an in and an out are controllable and influencing driving performance via a control unit receiving an output of said distance sensor.

* * * * *